US012600637B2

(12) United States Patent
Hilli

(10) Patent No.: US 12,600,637 B2
(45) Date of Patent: Apr. 14, 2026

(54) METHOD FOR PRODUCING A SOLID OBJECT FROM A BIOMATERIAL-BASED STARTING MATERIAL

(71) Applicant: Fifth Innovation Oy, Lempäälä (FI)

(72) Inventor: Tuomo Hilli, Lempäälä (FI)

(73) Assignee: Fifth Innovation Oy, Lempäälä (FI)

( * ) Notice: Subject to any disclaimer, the term of this patent is extended or adjusted under 35 U.S.C. 154(b) by 120 days.

(21) Appl. No.: 18/290,460

(22) PCT Filed: May 13, 2022

(86) PCT No.: PCT/FI2022/050323
§ 371 (c)(1),
(2) Date: Nov. 14, 2023

(87) PCT Pub. No.: WO2022/238626
PCT Pub. Date: Nov. 17, 2022

(65) Prior Publication Data
US 2024/0254056 A1       Aug. 1, 2024

(30) Foreign Application Priority Data

May 14, 2021     (FI) ..................................... 20215569

(51) Int. Cl.
| | |
|---|---|
| *C01B 32/324* | (2017.01) |
| *C01B 32/336* | (2017.01) |
| *C04B 35/524* | (2006.01) |
| *C04B 38/02* | (2006.01) |
| *C04B 38/10* | (2006.01) |
| *C04B 111/00* | (2006.01) |

(52) U.S. Cl.
CPC .......... *C01B 32/324* (2017.08); *C01B 32/336* (2017.08); *C04B 35/524* (2013.01); *C04B 38/02* (2013.01); *C04B 38/10* (2013.01); *C04B 38/106* (2013.01); *C01P 2006/10* (2013.01); *C01P 2006/12* (2013.01); *C04B 2111/00793* (2013.01); *C04B 2111/0081* (2013.01); *C04B 2111/00853* (2013.01); *C04B 2235/656* (2013.01); *C04B 2235/658* (2013.01); *C04B 2235/77* (2013.01)

(58) Field of Classification Search
CPC .... C01B 32/312; C01B 32/318; C01B 32/324
See application file for complete search history.

(56) References Cited

U.S. PATENT DOCUMENTS

| | | | | |
|---|---|---|---|---|
| 2,448,051 | A | 8/1948 | Reich | |
| 3,894,848 | A | 7/1975 | Kleiman et al. | |
| 3,894,878 | A * | 7/1975 | Mansmann | ........... C08L 97/005 |
| | | | | 521/88 |
| 4,058,403 | A | 11/1977 | Funabiki et al. | |
| 5,242,879 | A * | 9/1993 | Abe | ......................... B01J 20/20 |
| | | | | 210/756 |
| 10,335,763 | B2 * | 7/2019 | Petruska | .............. B01J 20/3078 |
| 11,332,371 | B2 * | 5/2022 | Mohanty | .............. C01B 32/318 |
| 11,795,066 | B2 * | 10/2023 | Hanamoto | ........... C01B 32/318 |
| 2017/0226535 | A1 * | 8/2017 | Tudman | ................ C01B 32/342 |

FOREIGN PATENT DOCUMENTS

| | | | | |
|---|---|---|---|---|
| CN | 102041125 A | 5/2011 | | |
| CN | 203754428 U | 8/2014 | | |
| CN | 104945841 A | 9/2015 | | |
| CN | 104945842 A | 9/2015 | | |
| CN | 106587001 A * | 4/2017 | | |
| CN | 110980731 A | 4/2020 | | |
| CN | 111589424 A | 8/2020 | | |
| CN | 109835897 B | 1/2021 | | |
| CN | 113830767 A * | 12/2021 | ........... | C01B 32/324 |
| DE | 2156131 A1 | 5/1973 | | |
| EP | 2322474 A1 * | 5/2011 | ........... | C01B 33/025 |
| EP | 2899175 A1 | 7/2015 | | |
| RU | SU1144679 A1 | 3/1985 | | |
| WO | WO2017049090 A1 | 3/2017 | | |
| WO | WO2018085918 A1 | 5/2018 | | |
| WO | WO2020049226 A1 | 3/2020 | | |

OTHER PUBLICATIONS

Ahmedna, Mohamed. "Granular activated carbons from agricultural by-products: preparation, properties, and application in cane sugar refining." (Jan. 2000). (Year: 2000).*
Dos Santos et al: Hydrothermal carbonization of sugarcane industry by-products and process water reuse: structural, morphological, and fuel properties of hydrochars. Biomass Conversion and Biorefinery, Apr. 9, 2021, vol. 12, No. 1, pp. 153-161.
Li et al: Efficient removal of cationic dyes via activated carbon with ultrahigh specific surface derived from vinasse wastes. Bioresource Technology, Dec. 14, 2020, vol. 322, pp. 1-8.

* cited by examiner

*Primary Examiner* — Benjamin A Schiffman
(74) *Attorney, Agent, or Firm* — Laine IP Oy

(57) ABSTRACT
The invention relates to a solid object and a method for producing the same. The solid object is produced from a biomaterial-based starting material comprising vinasse and/or molasses. In the method, a mixture produced from the starting material or a foam produced therefrom is formed and heat treated in order to produce a solid object. The obtained solid object is suitable to be used for example as a filler, a filter or catalyst substrate.

9 Claims, No Drawings

METHOD FOR PRODUCING A SOLID OBJECT FROM A BIOMATERIAL-BASED STARTING MATERIAL

BACKGROUND OF THE INVENTION

Field of the Invention

The present invention relates to solid biomaterial-based objects, their production and their use.

In particular, the invention concerns a solid object according claim 1, and a method for obtaining such an object. The invention also concerns use of the object.

Description of Related Art

Biomaterial-based materials and their production have been as the subject of research for some time, with the aim of achieving especially more ecological products. New uses for biomaterials are also constantly being developed where they can be utilized. The aim is also to make the most of the various by-products in the industry.

Molasses is a by-product of the sugar and ethanol industry. It is a viscous, dark brown, semi-liquid substance. The main component of molasses is sugar, so it has a relatively high nutritional value and therefore it is typically used as a food or feed, or used as a raw material in the fermentation industry. However, the liquid form and high viscosity of molasses make it considerably more difficult to be utilized, which is why molasses has been made mainly into a solid powder. For example, publication DE2156131 A1 discloses a dried powdery feed prepared by concentrating molasses, subjecting it in a thin film evaporator and pulverizing it.

Vinasse is another by-product of sugar and ethanol industry left over from the fermentation reaction of molasses. Vinasse composition obtained as a by-product comprises mainly water, but after dehydration vinasse is solid matter having a viscosity equivalent to molasses. Vinasse contains large amounts of salt and organic matter, thus causing problems when entering the soil. Efforts have been made to utilize it, for example, in fermentation reactions, irrigation fertilization and production of yeast and energy. Vinasse has also been utilized, for example, in production of porous powdery carbon materials, such as described in publication CN111589424 A. However, vinasse is produced in large quantities and its utilization should be greatly enhanced.

Carbon products, and especially so-called porous carbon, have uses in various applications, such as in thermal insulation (also at very high temperatures), various filters and catalysis. In catalytic reactions, porous carbonized materials are used in particular as carriers for catalysts due to their high specific surface area.

Traditionally, porous carbon materials are produced primarily by carbonizing synthetic resin foams, such as polyurethane and phenol resin foams. Such materials are non-ecological and expensive to manufacture. Thus, research seeks to find alternative materials for these synthetic substances. It is known, for example, to use lignin to replace phenols in polyurethane foam.

Earlier, efforts have been made to produce a variety of bio-based foam products mainly from pure biomaterial-based raw materials, such as tannin, lignin and furfural alcohol, but the use of impure raw materials has also been investigated. The prior art in this regard is represented, for example, by publication U.S. Pat. No. 3,894,848 which discloses production of porous formable material from aqueous solution of lignin. The method comprises foaming of the starting material and its heat treatment in a mold, as well as carbonization of the thus obtained porous material.

It is also known to produce from carbon materials activated carbon, the function of which is based on adsorption, wherein the activated carbon acts as an adsorbent binding certain molecules of either gaseous or liquid material to its surface. Typically, some molecules are already trapped in the pores of a foamed carbon material simply because of their physical size, depending of course on the pore size and size of the molecules, whereby the porous material acts as a so-called sieve as such. A notable feature of activated carbon is its particularly porous structure which provides its large specific surface area while simultaneously improving the filtering properties of the activated carbon.

The size of the effective surface area of activated carbon varies greatly depending on the degree of the carbon activation and the raw material used to produce the activated carbon. The aim is to choose a raw material that provides the best properties for the coming use of the activated carbon. The most common activated carbon raw materials used are wood, sawdust, peat, coconut shells, coal and crude oil residues. Typically, the selected raw material is crushed and then carbonized at a temperature of about 600 to 1000° C. During carbonization, most of the hydrocarbon and part of the carbon are removed, thereby increasing the surface area of the carbon. Activation of carbon can improve the adsorption capacity of organic substances of carbon by increasing the pore size and diameter. During activation, different substances are removed from the pores of the carbon leaving voids in the structure i.e. increasing the volume of the pores. As a result of the activation, the removing substances also form completely new pores in the carbon. Activated carbon typically has a specific surface area of 500 to 1500 $m^2/g$.

When selecting the raw material, it is important to consider the desired particle size of the final product, the structure of the pores, the total surface area and the void between the components, and of course the cost of the raw material. Typically, the activated carbon is provided either as a fine powder or in a granular form, but also foamed activated carbon has been produced.

There is still room for improvements in the properties, and in particularly in the formability, and in the used starting materials, of the biomaterial-based materials, especially solid and possibly porous materials. In particular, use of ecological starting materials should be enhanced and the utilization of industrial by-products further increased.

BRIEF SUMMARY OF THE INVENTION

It is an object of the present invention to utilize biomaterial-based starting materials in production of solid, possibly porous, formed objects.

In particular, it is an object of the present invention to provide a new kind of biomaterial-based object, and a method for production of such object. Especially, it is an object to provide a solid, possibly porous, object by using inexpensive starting materials which nevertheless have the necessary physical and chemical properties for use.

In particular, it is an object of the invention to provide a new kind of formed object in which the by-products of sugar and ethanol industry can be utilized.

It is also an object of the invention to provide a new kind of formable material.

The invention is based on the finding that by treating biomaterial-based starting material, that comprises vinasse and/or molasses, by the method of the invention, a bio-based solid object is provided. The object can also be porous and possibly carbonized or carbonized and activated. Thus, it has been surprisingly found in the invention that these by-products of sugar and ethanol industry can be used to produce solid objects for which there are numerous applications.

The biomaterial-based starting material according to the present invention comprises at least 10 weight-% of vinasse and/or molasses, calculated from the total weight of the starting material.

Thus, according to a first aspect, the present invention relates to a solid object produced from a biomaterial-based starting material comprising at least 10 weight-% of vinasse and/or molasses calculated from the total weight of the starting material. In particular, the present invention relates to a solid porous and carbonized object as described above.

In the method of the invention, a mixture comprising a liquid medium is produced, the mixture comprising at least 10 weight-% of vinasse and/or molasses calculated from the total weight of the starting material. The formed mixture or the formed foam obtained therefrom is further subjected to a heat treatment in order to cure the mixture into an object.

Thus, according to a second object, the present invention relates to a method of producing a solid object from a biomaterial-bases starting material, according to which method a mixture containing liquid medium is produced, the mixture comprising at least 10 weight-% of vinasse and/or molasses, calculated from the total weight of the starting material, and the formed mixture or the formed foam obtained therefrom is subjected to a heat treatment.

In the described way, biomaterial-based, possibly porous, solid objects are provided, which objects can be used for example in a variety of purification applications, such as in purification of gases and liquids or in cleaners, as a filler or as a catalyst substrate. Objects according to the invention can also be utilized as various building materials, such as tiles, bricks, plates or blocks.

Thus, according to a third object, the present invention relates to the use of the object as described above in purification applications, preferably in purification of gases and liquids or in cleaners, as a filler, as a catalyst substrate or as a building material.

More specifically, the invention is characterized by what is stated in the independent claims.

Considerable advantages are achieved by the invention. Thus, the invention provides self-standing monolithic, possibly porous, objects. In particular, porous formed objects are provided, which objects can be carbonized and activated throughout. The carbonized and activated porous object according to the invention has preferred properties, such as moderate electrical conductivity, low thermal conductivity and low density. These properties can also be diversely modified depending on the application. In the case of insulators, for example, low thermal conductivity may be sought by reducing the density, and electrical conductivity may be controlled, for example, by the addition of more electrically conductive metals to the foam. The electrical conductivity is also affected by the temperature used in the heat treatment, for example, high temperature heat treatment typically improves electrical conductivity. In addition, the material has good chemical resistance, i.e. it is not prone to pH fluctuations. Thus, the formed object according to the invention has wide application possibilities.

Most suitably, the foaming according to one embodiment of the invention occurs at normal pressure and at room temperature. However, the foaming can also be performed under reduced pressure or overpressure, for example at an absolute pressure of 0.1 to 10 bar. When the mixture is foamed without external heating, foaming can be better controlled and foam objects of uniform quality are obtained.

By-products of biorefinery as well as sugar and food industry, which are considerably cheaper starting materials than refined raw materials, can be effectively used as a starting material in the invention. Thus, it is possible to utilize cheaper, unrefined starting materials in the method of the invention, wherein also the side fractions of the fractionation process can be utilized. In addition to vinasse and/or molasses, a wide variety of lignocellulosic raw materials, such as various plants and parts thereof, side fractions of different fractionation processes, and digestate from peat and biogas plants and other partially biodegraded or processed materials, can be used as starting materials for the invention. The bio-based raw materials used in the invention reduce the need for fossil raw material. Further, the product according to the invention is clearly carbon-binding, i.e. negative in terms of carbon dioxide emissions. Thus, the utilization of vinasse and/or molasses enables production of highly competitive products also for lower priced products.

The production method of the invention has the additional benefit of being environmentally friendly, involving simple technology and having low energy consumption. Energy consumption can be reduced by harnessing the energy of the gas streams used in the various process steps by recovering it and utilizing for example in pre-heating. In addition, the volatile components used for foaming can be recycled by condensation and reuse. The volatile fractions generated during the carbonization step can also be utilized as an energy source or heat can be recovered from those by condensation, whereby also these liquid fractions can be utilized in other processes. Non-condensable gases can be burned and the energy thus produced can be utilized for example in the process, in heating or in power generation.

The object of the invention also has the benefit of being capable of recycling and reuse. The prepared object can be directly regenerated by heating or alternatively crushing, which after it can be used as a raw material of new object. Finally, carbonized material can be used as a soil improver, allowing the carbon ($CO_2$ negative) contained in it to be stored in the soil for a long term, or alternatively it can be burned to produce green energy.

Preferred embodiments of the invention will be discussed in more detail below.

DETAILED DESCRIPTION OF THE INVENTION

The present invention relates to a solid object and a method of producing the same.

According to one embodiment, it is a porous solid object. Porosity indicates the ratio of a non-solid substance (pores and liquid) to the total amount of the substance (solid and non-solid). Porosity is proportional to its density, as the porosity increases, the density decreases and, conversely, as the porosity decreases, the density increases. In the present invention, a porous object means a solid object having a density of less than 1 $kg/dm^3$, preferably not more than 0.8 $kg/dm^3$, more preferably 0.2 to 0.6 $kg/dm^3$. Density of an object is obtained by measuring the weight and volume of the object, which can be used to calculate the density (density=weight/volume). The weight and volume of the object can be measured by known methods, such as weighing the weight with a scale and measuring the amount of displaced liquid when immersing the object in the liquid, thereby determining the density. In the present application, all densities are measured by a corresponding method, unless otherwise stated.

The products to be produced will in the following be generally referred as "object". It is a three-dimensional object that has a form, i.e. a formed object. The object can be porous. When referring to a "foam object", the following refers specifically to a porous object obtained by foaming. After foaming, the porous object comprises mainly macropores. Typically, the smallest dimension of the pores in this case is at least 0.01 mm. Optional activation results in a large number of micropores and mesopores in the object.

Preferably in the present invention, a solid object means a formed object that has a permanent basic structure, i.e. the object is not reformable, especially by compression. However, according to one embodiment, it is still possible to form the solid object in other ways, such as by sawing or grinding, wherein the basic structure of the object still remains the same.

Most suitably the foam object is porous throughout, which means that the porous structure extends from the inside of the object to its surface. Most suitably, the foam object is permeable to gases.

The objects of the present invention are "monolithic" which in the present context means that their body structure consists of the same material throughout, i.e. the object is "one substance".

The objects are typically mechanically strong, i.e. have a compressive strength of more than 0.1 MPa, and the biomaterial-based starting material according to the present invention can be used to produce self-standing objects. "Self-standing" means that those can be used to form products, such as filters and the like, which do not require a separate body layer or structure.

The biomaterial-based starting material according to the present invention comprises at least 10 weight-% of vinasse and/or molasses calculated from the total weight of the starting material. According to a preferred embodiment, the biomaterial-based starting material comprises at least 20 weight-%, more preferably at least 30 weight-%, most preferably at least 50 weight-%, of vinasse and/or molasses calculated from the total weight of the starting material. Total weight of the starting material means the total weight of the mixture formed by all the used starting materials.

According to one embodiment, the biomaterial-bases starting material comprises 10, 15, 20, 25, 30, 35, 40, 45, 50, 55, 60, 65, 70, 75, 80, 85, 90, 95 or 100 weight-% vinasse and/or molasses calculated from the total weight of the starting material.

According to one embodiment, the biomaterial-bases starting material comprises only vinasse and/or molasses, however, preferably not more than 90 weight-%, more preferably not more than 80 weight-%, calculated from the total weight of the starting material.

According to one embodiment, the biomaterial-bases starting material comprises 10 to 90 weight-%, more preferably 20 to 80 weight-%, for example 30 to 70 weight-% of vinasse and/or molasses calculated from the total weight of the starting material.

Molasses is a viscous substance obtained as a by-product from the processing of, for example, sugar cane or sugar beet into sugar. However, molasses is also obtained from non-sugar crops, such as soy. Molasses contains mostly sugar and, in addition to that, also water and for example several minerals and vitamins. The amount of sugar varies, for example, according to the extraction method and the age of the plant used as raw material. Molasses typically contains about 20 weight-% of water calculated from the total weight of the molasses. The viscosity of molasses can be adjusted to a desired level either by adding water or dehydrating it off. In addition to the dry matter content, the viscosity of molasses is particularly affected by temperature.

Preferably, molasses is used in the present invention as such, i.e. at a water content of about 20 weight-%, calculated from the total weight of the molasses, without a separate viscosity pretreatment.

Vinasse is a liquid by-product of the fermentation of molasses, i.e. the liquid fraction remaining from the fermentation, with a solids content of less than 10 weight-%. It is also produces, for example, when straw or wood is used in the production of bioethanol Vinasse is typically used partially dehydrated to bring its viscosity to a level suitable for use. Vinasse has a high content of mineral nutrients and organic matter. According to a preferred embodiment, the vinasse used in the present invention is concentrated to a water content of preferably less than 50 weight-%, more preferably less than 40 weight-%, especially less than 20 weight-%, for example 10 to 20 weight-%. However, according to one embodiment, the water content of vinasse is at least 1 weight-%, preferably at least 5 weight-%, for example at least 10 weight-%. Thus, according to one embodiment, vinasse can be concentrated for example to a water content of 1 to 50 weight-%, preferably 5 to 40 weight-%. Water content of vinasse is expressed as calculated from the total weight of vinasse.

Thus, according to one embodiment, the starting material comprises vinasse that is concentrated to a water content of less than 40 weight-%, preferably 1 to 40 weight-%, more preferably 5 to 30 weight-%.

According to one embodiment, the concentrated vinasse contains practically no water, i.e. the vinasse has been concentrated to a water content of less than 0.1 weight-%.

According to one embodiment, the concentration can be performed by any known concentration method, however, preferably it is performed by ultrafiltration or nanofiltration or by evaporation, or any combination thereof.

Thus, according to a preferred embodiment, the present invention relates to a solid, possibly porous, object produced from a biomaterial-based starting material comprising at least 10 weight-% of vinasse and/or molasses calculated from the total weight of the starting material.

According to one embodiment, the starting material comprises both vinasse and molasses. According to another embodiment, the starting material comprises only one of these.

According to one embodiment, the starting material comprises vinasse and molasses in a ratio of 10:1 to 1:10, for example 1:1.

According to one embodiment, the biomaterial-based starting material used in the present invention further comprises liquid medium, preferably water, organic solution or ionic solution or a mixture of two or more of these. The liquid medium contained in the starting material may accompany the other starting material used, such as vinasse and/or molasses, and/or liquid medium may be added separately.

According to one embodiment, the biomaterial-based starting material according to the present invention comprises liquid medium, preferably water, 10 to 80 weight-%, preferably 20 to 70 weight-%, more preferably 30 to 60 weight-%, calculated from the total weight of the starting material.

According to one embodiment, the biomaterial-based starting material used in the present invention comprises, in addition to vinasse and/or molasses, also other biomaterial-based materials. According to one embodiment, the starting material comprises high molecular weight fractions (molecular weight greater than 500 g/mol) resulting from thermal or chemical fractionation of biomass. Such high molecular weight fractions include, for example, lignin, tannin and heavy "tars" from pyrolysis, which are mainly low-degraded compounds of lignin and tannin.

Components which, for example, modify the properties of the final product according to the intended use, can also be added to the mixture.

According to one embodiment, these components are added prior to possible foaming. According to another embodiment these components can also be added in any other method step, such as prior to drying or carbonization, or in several different steps.

In particular, the present invention enables utilization of a wide variety of industrial by-products and unrefined raw materials. In the invention, for example, lignocellulose-based raw materials, such as plants and their parts, as well as side fractions of various fractionation processes, can be utilized in various ways. The bio-based raw materials used reduce the need for fossil raw materials and carbon footprint of the product.

According to one embodiment, the starting material according to the present invention comprises other biomaterial-based materials, preferably high molecular weight fractions, to 80 weight-%, preferably at least 20 weight-%, for example 20 to 50 weight-%, calculated form the total weight of the starting material. Preferably, the starting material comprises high molecular weight fractions as a mixture, since in the present invention it is possible to utilize them without a separate separation step, i.e. they can be used as mixtures comprising also impurities.

According to one embodiment, hydrolysis lignin is used as a high molecular weight fraction, which hydrolysis lignin may optionally also contain impurities. Lignin content of the hydrolysis lignin can be for example 50 to 90 weight-%, for example 60 to 80 weight-%. Possible impurities in the hydrolysis lignin may comprise, for example, cellulose, hemicellulose and/or tannin.

In one embodiment, a substance or substances belonging to one or more of the following groups are added to the mixture:

a substance modifying mechanical properties of the produced objects (in particular those increasing their strength), a substance modifying the fire and rot resistance properties of the produced objects, catalyst, or a substance functioning as an insecticide in the produced objects.

According to one embodiment, the starting material further comprises other auxiliary agents, such as surface active agent, cross-linking agent or catalyst or a mixture of two or more of these. Typically, the starting material may comprise auxiliary agent for example 0.01 to 25 weight-%, preferably 0.1 to 10 weight-%, calculated from the total weight of the starting material.

According to one embodiment, the starting material also comprises a filler. Preferably, a recycled powdery biochar material or reduced carbon is used as a filler. Large amounts of recycled carbon will be generated and will only be generated in larger amounts in the future. In the future, large quantities of hydrogen will also be produced, as a by-product of which is generated a multiple amount of carbon that should be recovered. It has been surprisingly found in the present invention that such recycled carbon can be utilized as a filler in the solid objects according to the present invention.

Thus, according to a preferred embodiment, the reduced carbon potentially utilized in the present invention is produced by reduction by electrolysis, for example in the production of hydrogen from methane or the like, or in the decomposition of carbon dioxide.

According to one embodiment, the starting material comprises a filler, preferably reduced carbon, 1 to 50 weight-%, preferably 5 to 30 weight-%, more preferably 10 to 20 weight-%, calculated from the total weight of the starting material.

The object, possibly porous object, according to the present invention is formed and cured to a predetermined form, preferably by means of a mold. In the present invention, a mold refers to a hollow container which is intended to give the mixture or the foam to be placed in the mold some predetermined shape. In particular, the mold used in the present invention provides the object to be manufactured with a suitable form of the surface, but it can be also used to affect other properties of the surface, such as smoothness. The mold can also be used to create different pattern and/or texture on the surface of the object.

In addition, the mold used in the present invention should be such that the formed object can be removed intact therefrom. The formed object can be removed from the mold at any stage of the method after the heat treatment. According to a preferred embodiment, the mold is closable. However, the mold can also be open.

The material of the mold is not restricted in any way, as long as the material withstands the temperatures and/or chemicals used in the method. According to a preferred embodiment, the mold is aluminum, steel, ceramic or glass, or a mixture of two or more of these.

According to one embodiment, the object according to the present invention is further carbonized and optionally activated. During carbonization, most of the hydrogen (for example as a hydrocarbon) and oxygen and part of the carbon are removed, wherein the surface area of the carbon is increased. By activating the carbon, the pore size and diameter, i.e. the specific surface area of the object, can be further increased. Carbonization and activation also increase the mechanical strength of the object, especially foam object.

Carbon content of the object according to the present invention depends on the starting material used as well as on the temperature used in carbonization of the object. According to one embodiment, carbon content of a finished object is 50 to 100 weight-%, preferably 75 to 100 weight-%, for example 80 to 98 weight-%, calculated from the weight of the finished object.

According to one embodiment, the object according to the present invention has a density of less than 1 kg/dm$^3$, preferably up to 0.8 kg/dm$^3$, more preferably 0.2-0.6 kg/dm$^3$. Thus, the object of the invention is preferably porous.

According to one embodiment, the object according to the present invention has a density of 20 to 950 g/dm$^3$, preferably 50 to 500 g/dm$^3$ and compressive strength of about 0.07 to 7 MPa, preferably about 0.1 to 1.0 MPa.

However, the object may also have a density higher than 1 kg/dm$^3$, wherein the object is not considered porous by the definition of the present invention. In this case, the object is typically not carbonized because in the case of such dense object, the gas generated during carbonization is difficult to get out, wherein the object may "explode".

Especially, the foam object of the present invention is always porous. According to a preferred embodiment, the foam object has a density of 0.1 to 0.8 kg/dm³, preferably up to 0.2-0.6 kg/dm³, for example 0.3 to 0.5 kg/dm³.

According to one embodiment, the object according to the invention has a specific surface area of over 300 m²/g, preferably 500 to 2500 m²/g, more preferably 600 to 1200 m²/g. The specific surface area can be measured by BET-method (Brunauer, Emmet & Teller).

The present invention also relates to a method of producing the solid object according to the present invention.

In the method, a mixture of the starting material is produced and the formed mixture or the formed foam obtained therefrom is subjected to heat treatment. According to a preferred embodiment, there is specifically produced a mixture comprising a liquid medium. The liquid medium comprised in the starting material may accompany the other used starting material, such as vinasse and/or molasses, and/or the liquid medium can be added separately.

The liquid medium contained in the mixture of the starting material acts as foaming agent in the mixture. According to one embodiment the liquid medium is water. According to another embodiment the liquid medium can be for example organic solution, such as alcohol, or ionic solution. The liquid medium can also be a mixture of several liquids. By using liquid medium having a low boiling point (less than 100° C.), the amount of energy needed to drying of the foam can be reduced.

According to one embodiment the liquid medium used for foaming can be recovered and recycled to be reused.

Thus, according to one embodiment, the present invention relates to a method of producing solid, possibly porous, objects from a biomaterial-based starting material, according to which method a mixture containing liquid medium is produced, which mixture comprises at least weight-% of vinasse and/or molasses, and the formed mixture or the formed foam obtained therefrom is subjected to a heat treatment.

In the first step of the method, a mixture of a starting material is thus produced, the mixture comprising at least 10 weight-% of vinasse and/or molasses calculated from the total weight of the starting material. Preferably, the mixture is simply produced by mechanically mixing the desired components.

In the next step, the mixture or the foam produced therefrom is formed and heat treated in order to obtain formed object.

According to one embodiment, the possible foaming, forming and heat treatment of the mixture can be performed immediately after the preparation of the mixture or the mixture can be stored in between. Thus, the mixture can be stored and transferred even long times before using it in production of a solid object. The mixture can for example be stored in a freezer.

According to one embodiment, if a break is taken between the production of the mixture and the heat treatment, any possible catalyst which promotes the curing of the mixture or foam, such as sulfuric acid, is added to the mixture only just prior to the heat treatment, Preferably, the mixture or the foam obtained therefrom is formed, i.e. brought into a predetermined form, by means of a mold. The object produced by means of a mold obtains a clear form, such a cube, a cone, a cylinder, a ball, or any other predetermined form. In addition, the mold can be used to give the object some pattern or texture.

According to a preferred embodiment, the treatment of the mixture or the foam is carried out entirely in a mold.

According to one embodiment, the mixture of the starting material is placed in a mold and heat treated, wherein a solid formed object is obtained.

According to another embodiment, the mixture of the starting material is foamed and heat treated in a mold. The mixture can be foamed while it is in the mold or the mixture can be foamed prior to being fed in the mold. Preferably, the mixture of the starting material is foamed prior to being fed in the mold, wherein the mold can be carefully filled and the foamed object becomes precisely mold-shaped. The mold can be heated to promote foam solidification, as described below.

The mixture can be foamed by any of the well-known foaming methods, such as heating, mechanical mixing, blowing gas process or saline process. Preferably, the mixture is foamed by mechanically mixing or chemically. In chemical foaming a use can be made for example of sodium carbonate or potassium carbonate, which upon decomposition produce carbon dioxide and, alkaline part of which simultaneously serves as an activating additive. The foaming can be performed for example in a mixing tank.

In order to promote the foaming, a foaming agent, such as surface-active agent, such as polysorbate, can be added to the mixture for example about 0.1 to 10 weight-% calculated from the total weight of the mixture.

According to preferred embodiment the foaming is carried out at normal pressure or under a slight overpressure, for example at an absolute pressure of 1.1 to 10 bar. The foaming temperature is preferably above 20° C. but below 100° C. The reaction is exothermic i.e. without heating the foaming is better controllable and the shaping of the object is easier.

The mixture or the foam formed as described above is subjected to a heat treatment. The formed mixture or foam is heat treated in a mild temperature, i.e. below 500° C., to consolidate the mixture of the foam. In a preferred embodiment the heat treatment is carried out while the foam is still in the mold. However, the heat treatment can also be carried out in a separate oven when the material is consolidated enough.

According to one embodiment, the material can also be changed from one mold to another during the heat treatment, before the object is totally consolidated, wherein the object takes a new form.

The heat treatment is carried out by heating the mixture or foam to a suitable temperature and by holding it at this temperature for a sufficient time, such as for 10 to 300 minutes, preferably 20 to 150 minutes, according to the composition of the starting mixture. Preferably, the mixture or foam is heat treated at a temperature not more than 300° C., for example at 50 to 300° C., preferably at 80 to 250° C., in order to consolidate the mixture of foam. Usually, the heat treatment is carried out at normal air pressure (about 1 bar pressure) but of course it is also possible to be carried out in vacuum or at an elevated pressure, for example at an absolute pressure of about 0.01 to 10 bar.

According to one embodiment, the heat treated solid object can further be carbonized and optionally activated. Typically, the object is maintained in the mold also during carbonization and activation, if the mold is such that the gases released during carbonization and activation can pass freely therein.

In another preferred embodiment the heat treated object is taken directly, without substantially lowering its temperature, to the next step, where it is carbonized and optionally activated.

According to one embodiment, the heat treated object is carbonized in an inert, oxygen-free, gas phase at a temperature not more than 1500° C., preferably at 500 to 1200° C., more preferably at 600 to 1000° C. Preferably, the temperature of the object is raised slowly up to the carbonization temperature. According to one embodiment, a suitable heating rate is about 1 to 120° C./minute, in particular the temperature is raised in a heat treatment vessel at a rate of about 5 to 50° C./minute, for example about 10 to 30° C./minute.

The inert gas phase used in the carbonization can contain any gases which are essentially inert under the carbonization conditions. As an example of such gases a mention can be made of nitrogen, helium, carbon dioxide and argon and mixtures thereof.

The optional carbonization can be carried out in a closable reactor or in an oven. Typically, such reactor or oven operates close to the atmospheric pressure or at a slight overpressure.

According to one embodiment, the carbonized object is taken directly, without substantially lowering its temperature, to the next possible process step in which it is activated in order to further increase its specific surface area.

According to one embodiment the object is chemically activated. Preferably, the chemical activation is carried out by heating the material treated with activation chemicals to a temperature of 400 to 800° C. The activation chemicals are used to remove moisture from the material. As activation chemicals a use can be made for example of alkali salts, phosphoric acid, zinc chloride or sulfuric acid or a mixture or two or more of these.

According to another embodiment the object is physically activated, wherein the carbon is activated by gas at a temperature of about 700 to 1100° C. The used gas can be for example water vapor, carbon dioxide or a mixture thereof. Due to the exothermic reactions of the activation, hydrogen, carbon monoxide and carbon dioxide are removed from the material.

According to a preferred embodiment, the carbonized object is further activated with carbon dioxide, water vapor or a mixture thereof at a temperature above 500° C., preferably at 600 to 900° C., wherein the specific surface area of carbon is over 300 $m^2/g$, preferably 500 to 2500 $m^2/g$, more preferably 600 to 1200 $m^2/g$. In particular, the object is preferably activated with water vapor. The external adsorption surface area of the activated material then becomes large and the structure has small pores, wherein the object comprises mainly micropores (pores below 2 nm) and mesopores (pores of 2 to 50 nm), respectively.

According to one embodiment the object produced by the method can be washed in order to reduce possible inorganic materials. The washing can be carried out for example with water, aqueous acid, alkali or with some other solution, in particular with aqueous solution. After this, the object can be optionally dried by generally known drying methods.

According to a preferred embodiment, the solid object according to the present invention is produced by a continuous process. In the context of the present invention, the term "continuous" refers to a method in which the objects are in continuous movement moving from one method step to another, or in which method the objects to be produced move directly to the next method step without storage between the steps. Such continuous process can be implemented for example by means of a tunnel kiln possibly comprising of several kiln zones. Preferably, the objects move from possible several kiln zones to another without having to deal with external environment between the steps. In practice, this means that the furnace assembly used in the method has an inlet and outlet between which the object moves forward from one step to another without separate measures being taken.

The present invention also relates to the use of the solid object according to the present invention. In particular, the object is suitable to be used in purification applications, such as in purification of gases and liquids, or in cleaners, as a filler or as a catalyst substrate.

According to one embodiment an efficient energy use can be combined to the method according to the present invention when the energy of the gas streams used at different process steps are utilized.

According to one embodiment, the volatile fractions resulting from the carbonization step of the method according to the invention are condensed, wherein the heat energy can be recovered from those. At the same time liquid fractions are formed, which fractions can be utilized in other processes. The liquid fractions can be recovered or burned.

According to another embodiment, which can also be combined to the previous one, the volatile fractions resulting from the carbonization step and the possible non-condensable gases of the previous embodiment are burned to generate energy. The generated energy can be utilized for example in the process, heating or power generation.

According to one embodiment the recovered heat energy can be utilized in the internal heating of the process i.e. for example in the heating of the raw materials or the building. According to another embodiment the heat energy can be sold to third parties.

EXAMPLES

Example 1

First, a mixture of the starting material comprising liquid medium is formed. Vinasse is used as one starting material, which vinasse is concentrated by ultrafiltration to a water content of 12 weight-%. The mixture of the starting material is formed by mixing together 60 weight-% of concentrated vinasse, 30 weight-% of hydrolysis lignin (80 weight-% lignin content, rest being impurities, such as cellulose, hemicellulose and inorganic salts) and 0.2 weight-% of components improving cross-linking. Also 2.5 weight-% of sulfuric acid is added into the mixture prior to subjecting it to a heat treatment.

Next, the produced mixture is fed into a mold having a desired form, and the filled mold in subjected to a heat treatment, i.e. consolidation stage, in which the object receives its permanent form. The heat treatment is carried out in an oven at a temperature of 175° C., at normal air pressure, by keeping the mixture there for 100 minutes. The obtained formed solid object is subjected in a mold to the carbonization and activation treatment. The carbonization is carried out in an oxygen-free gas atmosphere at 800° C., for 30 minutes.

The carbonized object is activated with carbon dioxide at 800° C., for 120 minutes.

Example 2

First, a mixture of the starting material comprising liquid medium is formed. The mixture is formed by mixing together 60 weight-% of molasses (water content 25 weight-%), 20 weight-% of lignosulfonate, 1.0 weight-% of cross-linking agent, 2 weight-% of surface active agent (polyoxy-ethylene sorbitan trioleate, Tween 85), 10 weight-% of furfural and 4 weight-% of sulfuric acid. The rest of the mixture is water.

Next, the produced mixture is fed into a mold having a desired form, and the filled mold in subjected to a heat treatment, i.e. consolidation stage, in which the object receives its permanent form. The heat treatment is carried out in an oven at a temperature of 190° C., at over pressure of 100 Pa, by keeping the mixture there for 90 minutes. The obtained formed object is subjected without a mold to the carbonization and activation treatment. The carbonization is carried out in an oxygen-free gas atmosphere at 800° C., for 15 minutes. The carbonized object is activated with carbon dioxide at 800° C., for 180 minutes.

Example 3

First, a mixture of the starting material comprising liquid medium is formed. The mixture of the starting material is formed by mixing together molasses (water content 25 weight-%), lignosulfonate and kraft-lignin. Sulfuric acid and a surfactant are added to the mixture, followed by vigorous stirring for about two minutes to foam the mixture. The mixture of the starting material thus comprises 50 weight-% of molasses (water content 25 weight-%), weight-% of lignosulfonate, 10 weight-% of kraft-lignin, 5 weight-% of sulfuric acid and 5 weight-% of surface active agent.

Next, the foamed mixture, produced by mechanical mixing, is fed into a mold having a desired form, and the filled mold in subjected to a heat treatment, i.e. consolidation stage, in which the object receives its permanent form. The heat treatment is carried out in an oven at a temperature of 175° C., at normal air pressure, by keeping the mixture there for 180 minutes.

INDUSTRIAL APPLICABILITY

The solid, possibly porous, object according to the invention can generally be utilized extensively for a variety of industrial applications. The produces, especially porous, object can be used for example in various purification applications, such as in purification of gases and liquids, and in cleaners and filters, such as in automotive fresh air filters.

Other applications for the object according to the invention are for example use as a filler, catalyst substrate, for storing of gases and as electrode, for example as electrode plate in a hydrogen cell or as an anode or cathode in electrostatic precipitators, thus replacing expensive alloys. In addition, the objects are suitable for use as building materials, such as tiles (indoor and outdoor use), insulation, bricks, plates or blocks and interior materials. The objects can also be used as surface or body material in variety of vehicles, such as cars, boats, ships and airplanes. The object are also suitable for different hygienic conditions because they are very resistant for example to various solvents, alkalis, acids, and it is also possible to coat the objects antibacterially. Also the use as the invisible material of radar is possible.

The invention is not intended to be limited to the exemplary embodiments set forth above, on the contrary, it is intended to be broadly construed within the scope defined by the following claims.

REFERENCES

Patent Literature

DE2156131 A1
CN111589424 A
U.S. Pat. No. 3,894,848

The invention claimed is:

1. A method for producing a porous solid object from a biomaterial-based starting material, the method comprising:
   forming a mixture or a foam from the starting material, the starting material comprising at least 10 weight-% of vinasse and/or molasses, calculated from the total weight of the starting material, and
   subjecting the formed mixture or the formed foam obtained therefrom to a heat treatment to produce the porous solid object,
   wherein the porous solid object has a density of less than 1 kg/dm³.

2. The method according to claim 1, which is performed by a continuous process.

3. The method according to claim 1, wherein the formed mixture or the formed foam is brought to a predetermined form via a mold.

4. The method according to claim 1, wherein the formed mixture or the formed foam is heat treated at a temperature not more than 300° C. in order to consolidate the formed mixture or the formed foam.

5. The method according to claim 1, wherein the solid object is carbonized in an oxygen-free gas atmosphere at a temperature not more than 1500° C.

6. The method according to claim 5, wherein the carbonized object is activated with carbon dioxide, water vapor, or a mixture thereof at a temperature of more than 500° C.

7. The method according to claim 1, wherein the starting material further comprises a liquid medium selected from the group consisting of water, an organic solution, an ionic solution, or a mixture of two or more of these.

8. The method according to claim 1, wherein the mixture is foamed prior to feeding into a mold.

9. The method according to claim 1, wherein the heat treatment of the formed mixture or the formed foam is carried out entirely in the mold.

* * * * *